(12) United States Patent
Sakai

(10) Patent No.: US 10,362,188 B2
(45) Date of Patent: Jul. 23, 2019

(54) IMAGE PROCESSING METHOD, PROGRAM, AND IMAGE PROCESSING APPARATUS

(71) Applicant: CANON KABUSHIKI KAISHA, Tokyo (JP)

(72) Inventor: Hiroyuki Sakai, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/605,648

(22) Filed: May 25, 2017

(65) Prior Publication Data

US 2017/0346975 A1 Nov. 30, 2017

(30) Foreign Application Priority Data

May 31, 2016 (JP) ................................ 2016-109282

(51) Int. Cl.
*H04N 1/00* (2006.01)

(52) U.S. Cl.
CPC ..... *H04N 1/00779* (2013.01); *H04N 1/00708* (2013.01); *H04N 1/00724* (2013.01); *H04N 1/00734* (2013.01); *H04N 1/00742* (2013.01); *H04N 2201/0082* (2013.01)

(58) Field of Classification Search
CPC ....................... H04N 1/00779; H04N 1/00708
See application file for complete search history.

(56) References Cited

U.S. PATENT DOCUMENTS

| | | | | |
|---|---|---|---|---|
| 4,506,302 A * | 3/1985 | Kurata | ............... | H04N 1/00681 346/134 |
| 6,349,243 B1 * | 2/2002 | Takagi | ................. | B41J 13/0036 700/223 |
| 6,616,052 B2 * | 9/2003 | Tseng | ..................... | G06K 19/08 235/382 |
| 9,729,744 B2 * | 8/2017 | Nguon | ............... | H04N 1/00726 |
| 9,926,156 B2 * | 3/2018 | Sato | ........................ | B65H 1/04 |
| 2014/0219885 A1 * | 8/2014 | Cong | .................. | G01N 33/558 422/403 |

FOREIGN PATENT DOCUMENTS

JP 2004-338338 A 12/2004

* cited by examiner

*Primary Examiner* — Ibrahim Siddo
(74) *Attorney, Agent, or Firm* — Canon USA, Inc., IP Divison

(57) ABSTRACT

A captured image is obtained in which an adapter tray is captured which is fitted in a predetermined first area in a conveyance tray conveyed by a printing apparatus and has a second area fitted with a printing medium on which printing is performed by the printing apparatus. A shape of the second area is specified based on the captured image and information about the predetermined first area. Further, an image based on the specified shape of the second area is output.

15 Claims, 11 Drawing Sheets

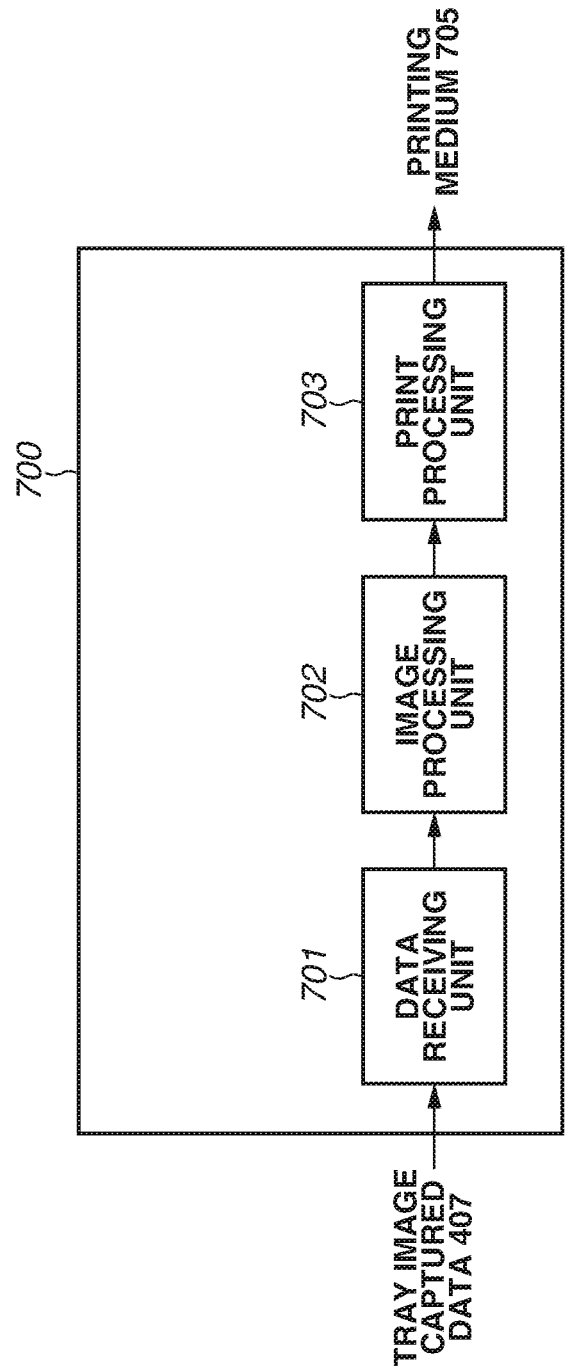

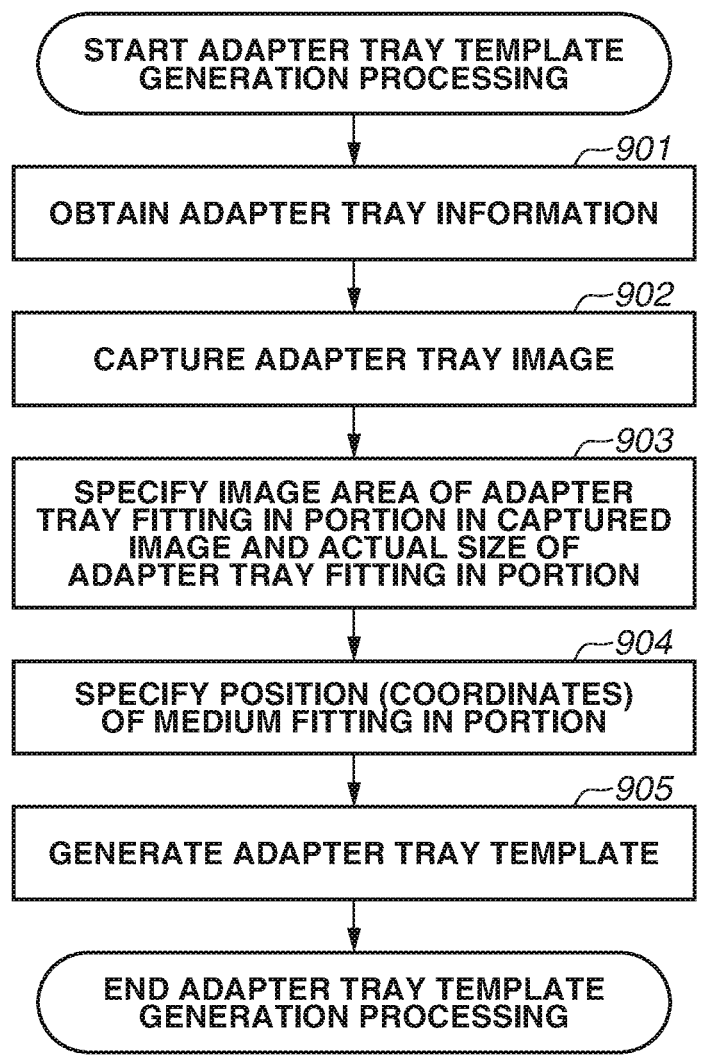

IMAGE PROCESSING METHOD, PROGRAM, AND IMAGE PROCESSING APPARATUS

BACKGROUND

Field of the Disclosure

The present disclosure relates to an image processing method for performing processing regarding an adapter tray in which a printing medium is fitted, a program, and an image processing apparatus.

Description of the Related Art

Conventionally, there is a technique for printing an image on a label surface of a printable disk such as a compact disk (CD) and a digital versatile disk (DVD) by an ink jet printer. In this regard, as a method for conveying a disk in the printer, there is a method in which a user fits the disk in a dedicated disk tray, and the disk tray is conveyed in a conveyance path different from a conveyance path in which a printing sheet is conveyed.

Specifically, a user fits a printable disk in the disk tray and inserts the tray into the printer. The printer conveys the inserted tray to a position at which a printing head ejects ink. The printer executes printing by repeating conveyance of the tray and ejection of the ink to a position at which the printable disk is fitted in the tray.

In addition, a recess to be fitted with the disk may be formed in the above-described disk tray in some cases. For example, a recess having a size tailored to a predetermined size for fitting a printable disk having the predetermined size therein is prepared in advance, and a user uses the printable disk by fitting it into the recess of the tray.

Japanese Patent Application Laid-Open No. 2004-338338 describes a technique for determining a type of a printing medium fitted in a tray. Specifically, a user fits a printing medium in an adapter to be fitted in a recess portion of a disk tray, fits the adapter into the disk tray, and thus fits the printing medium in the tray. In addition, it is described that the adapter is provided with a bar code in which information regarding a type of the printing medium is recorded, and the type of the printing medium is determined by reading the information.

According to the technique described in Japanese Patent Application Laid-Open No. 2004-338338, information of a shape of the printing medium and the like need to be stored in the bar code in advance, and an apparatus for reading the bar code also needs to store the shape of the printing medium corresponding to the information in advance. Thus, regarding a printing medium of which a shape is not stored in the system described in Japanese Patent Application Laid-Open No. 2004-338338, processing corresponding to the shape and the size thereof cannot be performed.

SUMMARY

The present disclosure is directed to the provision of a technique capable of outputting an image according to printing media having various shapes and sizes to be fitted in an adapter tray.

A method for processing an image according to an aspect of the present disclosure includes obtaining a captured image in which an adapter tray is captured which is fitted in a predetermined first area in a conveyance tray conveyed by a printing apparatus and has a second area fitted with a printing medium on which printing is performed by the printing apparatus, specifying a shape and a size of the second area based on the captured image obtained in the obtaining and information about the predetermined first area, and outputting an image based on the shape and the size of the second area specified in the specifying.

Further features of the present disclosure will become apparent from the following description of exemplary embodiments with reference to the attached drawings.

BRIEF DESCRIPTION OF THE DRAWINGS

FIG. 7 is a block diagram illustrating a software configuration of a print control device according to one of more aspects of the present disclosure.

FIG. 9 is a flowchart illustrating adapter tray template generation processing according to one of more aspects of the present disclosure.

DESCRIPTION OF THE EMBODIMENTS

A basic configuration of an exemplary embodiment is described below.

<Description of Hardware Configuration for Information Processing>

Figure 1:
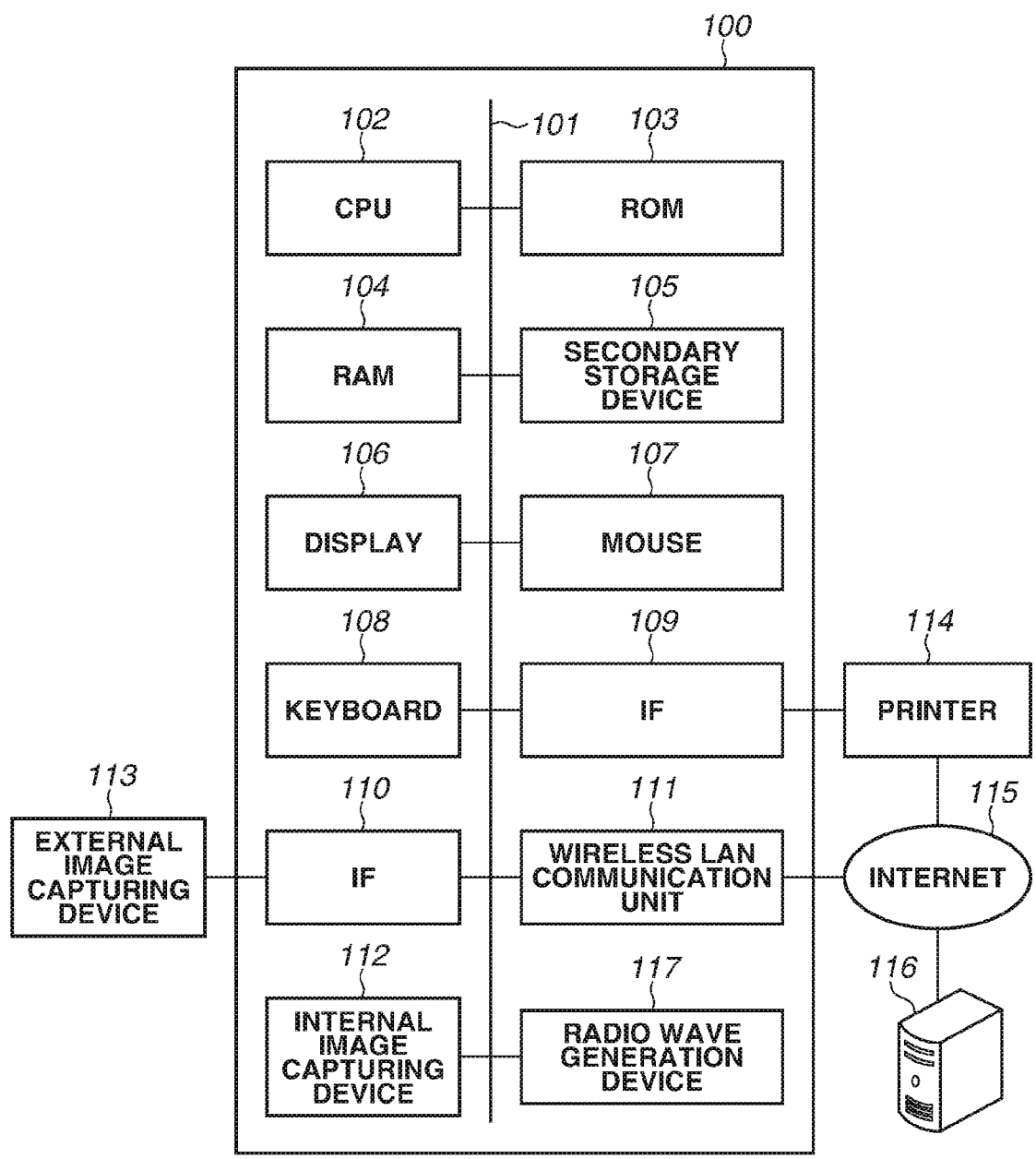
FIG. 1 is a block diagram illustrating an example of a hardware configuration of an image processing apparatus according to one of more aspects of the present disclosure.

FIG. 1 is a block diagram illustrating an example of a hardware configuration of an image processing apparatus according to the present exemplary embodiment.

In FIG. 1, an image processing apparatus 100 is constituted of devices described below. A control bus/data bus 101 connects each unit and a central processing unit (CPU) 102 with each other. The CPU 102 executes an image processing method described in the present exemplary embodiment according to a program. A read only memory (ROM) 103 stores a program corresponding to the image processing method according to the present exemplary embodiment executed by the CPU 102. A random access memory (RAM) 104 provides a memory for temporarily storing various information pieces when the CPU 102 executes the program. A secondary storage device 105 is a storage medium such as a hard disk for storing a database and the like which stores an image file and an image analysis result. A display 106 is a device for presenting a processing result according to the present exemplary embodiment to a user.

The image processing apparatus 100 includes user interfaces (UI) such as a mouse 107 for a user to input an instruction of processing and a keyboard 108 for inputting a character and the like in addition to the above-described devices. The display 106 may have a touch panel function which is a function of performing a processing instruction, character input and the like by an operation on a touch panel instead of the mouse 107 and the keyboard 108. Further, the image processing apparatus 100 may include an internal image capturing device 112 such as a digital camera. An image captured by the internal image capturing device 112 is subjected to predetermined image processing and then stored in the secondary storage device 105.

A part or a whole of a control program stored in the ROM 103 may be stored in the secondary storage device 105, and the control program includes an operating system (OS) and an application program 400 described below.

Image data may be read from an external image capturing device 113 connected to the image processing apparatus 100 via an interface (IF) 110. Further, the image processing apparatus 100 includes a wireless local area network (LAN) communication unit 111 for performing communication by a wireless LAN, and the LAN is connected to the Internet 115. The CPU 102 can obtain an image from an external server 116 connected to the Internet 115 by the wireless LAN communication unit 111 via the wireless LAN.

A printer 114 which prints an image and the like on a printing medium as a printing apparatus according to the present exemplary embodiment is connected to the image processing apparatus 100 via an IF 109. The printer 114 is further connected to the Internet 115 and can exchange print data with the image processing apparatus 100 via the above-described wireless LAN communication unit 111. The image obtained by the image processing apparatus 100 by the above-described various methods is transmitted to the printer 114 via the IF 109 by the control of the CPU 102 and printed by the printer 114.

A radio wave generation device 117 produces a magnetic field by electricity transmitted from the image processing apparatus 100 and generates radio waves to perform data communication and the like. The radio wave generation device 117 has, for example, a short-range wireless communication function such as near field communication (NFC).

An apparatus in which the image processing apparatus 100 is incorporated is a mobile computer terminal such as a smartphone, a tablet, and a personal computer (PC). Further, the apparatus in which the image processing apparatus 100 is incorporated may be various apparatuses such as a digital camera, a video camera, a television, and a loudspeaker.

<Description of Hardware Configuration for Print Processing>

Figure 2:
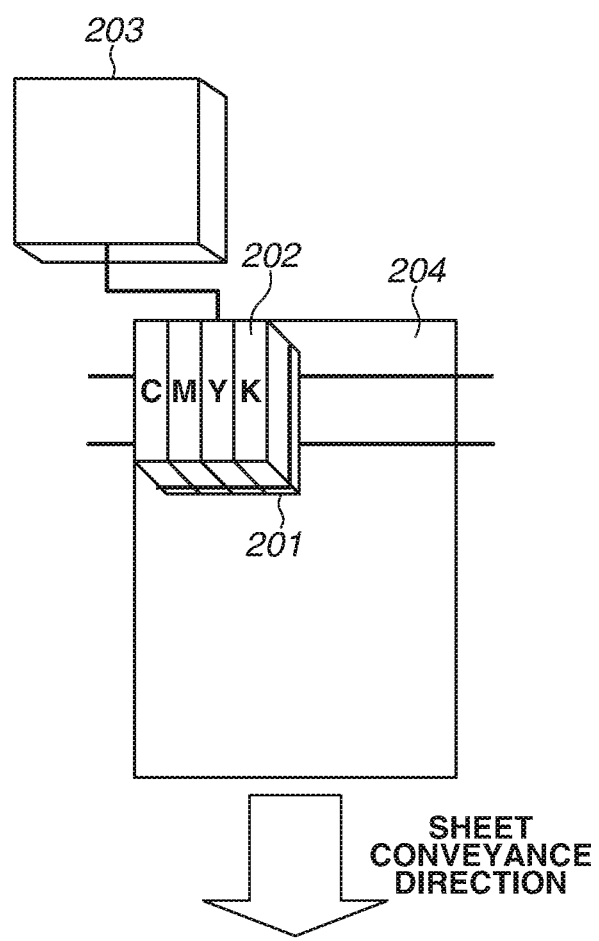
FIG. 2 is a schematic diagram illustrating a printing head of an ink jet printing apparatus according to one of more aspects of the present disclosure.

FIG. 2 is a schematic diagram illustrating a printing head of an ink jet printing apparatus according to the present exemplary embodiment. The printer 114 illustrated in FIG. 1 includes a printing head 201 illustrated in FIG. 2. The printing head 201 is mounted with an ink unit 202 filled with ink. In FIG. 2, four colors are mounted in the ink unit 202 as an example, however, any colors can be used. A control circuit unit 203 includes a storage unit, a calculation unit, and a communication unit necessary for driving the printing head 201. The printing head 201 receives a recording signal and a control signal from the control circuit unit 203 and ejects the ink based on the recording signal according to the control signal. A printing medium 204 is conveyed by a conveying roller, which is not illustrated, and an image is recorded on the printing medium 204.

Figure 3A:
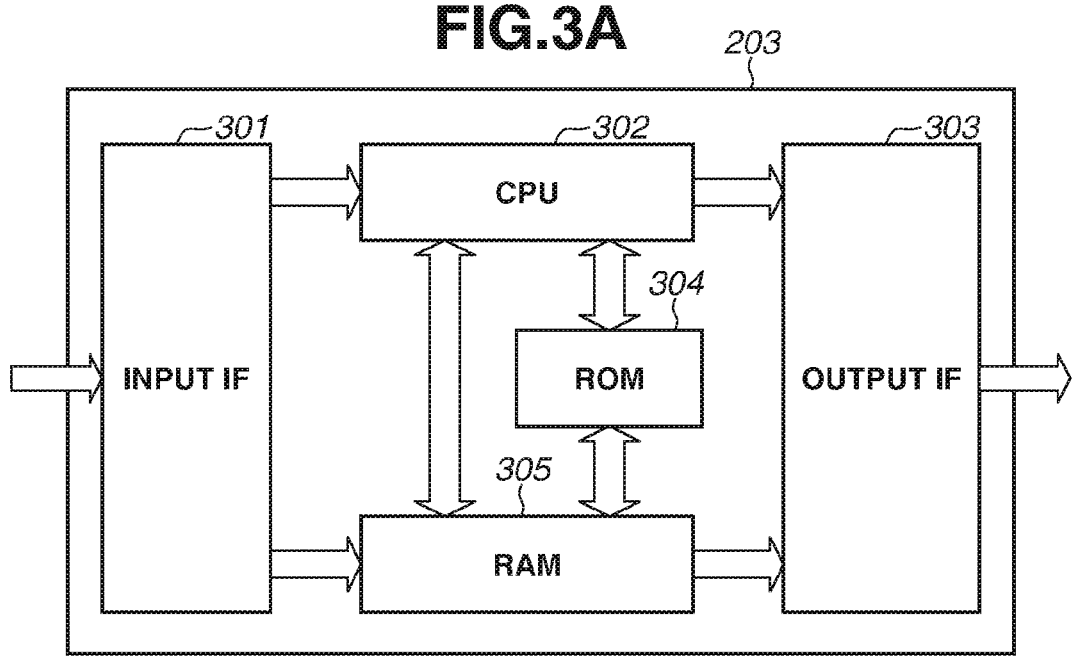
FIGS. 3A and 3B are block diagrams illustrating a configuration of a printer according to one of more aspects of the present disclosure.
Figure 3B:
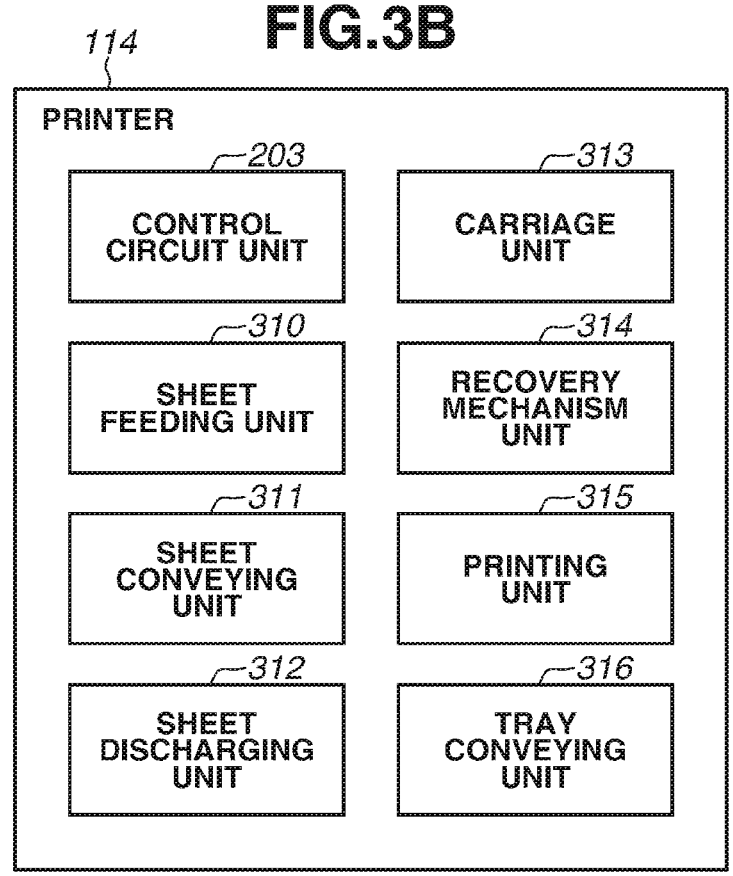

FIGS. 3A and 3B are block diagrams illustrating a configuration of the printer 114. FIG. 3A illustrates a configuration of the control circuit unit 203, and the control circuit unit 203 includes an input interface 301, a CPU 302, an output interface 303, a ROM 304, and a RAM 305. The input interface 301 receives image data as a print target and an input of a control signal for driving the printing head from an operation unit, an external computer, and the like, which are not illustrated. The input interface 301 transmits the image data and the control signal to the RAM 305 and the CPU 302. At that time, the CPU 302 executes a control program stored in the ROM 304 which is a nonvolatile memory and performs signal processing on the image data. The image data subjected to the signal processing is output from the output interface 303 as print data together with the control signal. The printing head 201 is driven by the output print data and the control signal, and an image is printed on the printing medium 204.

FIG. 3B illustrates an entire configuration of the printer 114. The printer 114 may include a configuration not illustrated in FIG. 3B. The printer 114 includes a sheet feeding unit 310, a sheet conveying unit 311, a sheet discharging unit 312, a carriage unit 313, a recovery mechanism unit 314, a printing unit 315, and a tray conveying unit 316 in addition to the above-described control circuit unit 203.

The sheet feeding unit 310 includes a cassette for storing a sheet material P such as a print sheet, a sheet feeding port, and a sheet feeding roller for feeding the sheet and feeds the sheet material P to the sheet conveying unit 311. The sheet conveying unit 311 includes a conveying roller for conveying the sheet material P such as the print sheet fed from the sheet feeding unit 310 and a paper end (PE) sensor. The conveying roller is applied with a load at the time of rotation, and thus conveyance is stably performed. Therefore, a conveying roller tension spring is disposed between a bearing and the conveying roller to apply a force to the conveying roller, so that a predetermined load is applied thereto. The sheet discharging unit 312 includes two sheet discharging rollers, spurs which can followingly rotate by abutting on the sheet discharging rollers at a predetermined pressure, and a gear train for transmitting driving of the conveying roller to the sheet discharging rollers. The sheet discharging rollers are attached to a platen.

The sheet discharging roller on an upper stream side of a conveyance direction is provided with a plurality of rubber portions (sheet discharging roller rubber) on a metal shaft. The other sheet discharging roller has a configuration in which a plurality of elastic members such as elastomer is attached to a resin shaft. The spur is attached to a spur holder and pressed to contact with the sheet discharging roller by a spur spring which is formed by arranging a coil spring in a rod shape. The spurs includes the one mainly producing a force for conveying the sheet material P when recording is performed and the one mainly preventing the sheet material P from floating when recording is performed.

A sheet end support is provided between the sheet discharging rollers. The sheet end support lifts up both ends of the sheet material P and holds the sheet material P at a tip of the sheet discharging roller so as to prevent damage on or quality degradation of a recording image caused by scrubbing of an image recording portion on the above-described sheet material P. The sheet end support applies a force to a resin member by a sheet end support spring to attach an idler roller to the sheet material P at a predetermined pressing force and thus lifts up the both ends of the sheet material P to give stiffness to the sheet material P to hold the sheet material P.

The carriage unit 313 includes a carriage to which the printing head 201 is attached. The carriage is guided and supported by a guide shaft and a guide rail disposed in a direction perpendicular to the conveyance direction of the sheet material P so as to be able to reciprocate in a main scanning direction as illustrated in FIG. 2. The guide rail also has a function of maintaining a clearance (sheet interval) between the printing head and the sheet material P at a proper value by holding a trailing edge of the carriage. The guide shaft is attached to a chassis, and the guide rail is formed integrally with the chassis.

The recovery mechanism unit 314 includes a suction pump for performing suction recovery processing for maintaining and recovering an ejection performance of the printing head 201 and a cap for protection and drying prevention of an ink ejection port surface of the printing head 201. The recovery mechanism unit 314 further includes a wiper blade for wiping and removing adhering substances such as an ink and dust on a surrounding part of the ejection port of the ejection port surface of the printing head.

The printing unit 315 includes the printing head 201 as an inkjet printing head. To the printing head 201, an ink tank is independently attached for each ink in a replaceable manner. The printing head 201 applies heat to the ink by a heater (a heating element) and the like based on recording data. The heat causes film boiling of the ink. The ink is ejected from the ejection port of the printing head 201 by a pressure change caused by growth or contraction of bubbles in the film boiling, and an image is recorded (printed) on a recording material by the ejected ink drops.

The tray conveying unit 316 includes a slide cover, a tray guide, and an arm. An inclined portion formed on a leading edge of the arm enables the arm to smoothly enter between the platen and the spur holder. Accordingly, a space is formed between the platen and the spur holder through which a tray fitted with a disk tray of a CD (a CD readable (CD-R) and the like), a DVD, and the like as a recording material passes.

The arm is positioned in a state inserted between the platen and the spur holder, and when the arm is stored in the tray guide before protruding (advancing), the arm is in a state having a backlash with respect to the tray guide. When the slide cover is in a state not being moved toward a main body direction of the printing apparatus, an opening portion of the tray conveying unit is closed, so that the tray cannot be inserted. When the slide cover is moved toward the main body direction of the printing apparatus, the slide cover is moved toward an oblique upper direction, and the opening portion is formed for inserting the tray between the slide cover and the tray guide. A user can insert the tray fitted with the disk tray from the opening portion and set the tray to a predetermined position. In this regard, a hardware configuration common to the sheet conveying unit 311 may be used as a part of the hardware configuration of various motors and rollers included in the tray conveying unit 316.

According to the present exemplary embodiment, the tray conveyed by the tray conveying unit 316 is fitted with printing media having various shapes and sizes in addition to a disk medium. For example, the tray is provided with a predetermined recess portion, and an adapter having a shape tailored to the recess portion is fitted in the tray. Further, the adapter is fitted with the printing medium, and a plurality of types of the adapters may be fitted as the adapters corresponding to various shapes and sizes of the printing media.

When an outer shape of the adapter corresponds to the recess portion of the tray, the adapter can be fitted in the tray if a fitting portion for the printing medium in the adapter has various shapes and sizes.

In other words, when a user prepares an adapter corresponding to a shape and a size of a printing medium on which printing is performed, fits the printing medium in the adapter, and further fits the adapter in the tray, so that the printing media having various shapes and sizes can be fitted in the tray. The tray to be fitted with the adapter in the above-described manner is described in below with reference to FIGS. 8A to 8C.

According to the present exemplary embodiment, a tray fitted with a disk medium such as a CD is also conveyed by the tray conveying unit 316. A tray for a disk medium according to the present exemplary embodiment is described below. The tray according to the present exemplary embodiment is formed by a resin plate about 2 to 3 mm thick. The tray is provided with a fitting portion of a medium such as a CD, an operation portion to be held by a user when the tray is taken in and out, a position detection mark, a hole for taking in and out the CD, a tray insertion positioning mark, a lateral pressure idler roller relief portion, and a medium presence detection mark. Further, a tray sheet is attached to a leading edge of the tray to ensure approach (engagement) of the tray to the conveying roller and a pinch roller.

The tray is formed by a sheet material made of polyethylene terephthalate (PET) and the like about 0.1 to 0.3 mm thick and has a predetermined friction coefficient and hardness. The tray itself has a taper portion on a leading edge thereof.

When the tray conveying unit 316 performs conveyance, the tray sheet is engaged between the conveying roller and the pinch roller, and thus a conveyance force is generated. Next, the taper portion on the leading edge of the tray lifts up the pinch roller, and the tray having thickness is pinched between the conveying roller and the pinch roller, so that the tray can be accurately conveyed.

The position detection mark is disposed on a position corresponding to the space between the pinch rollers next to each other. Thus, the position detection mark is prevented from abutting on the pinch roller, and a surface of the position detection mark is protected from being damaged. The position detection marks are provided on two points on a leading edge side and one point on an opposite side of the CD fitting portion of the tray.

Each position detection mark is provided with a highly reflective member in a square of a side about 3 to 10 mm. A concave portion is formed around the position detection mark, and a reflective material can be formed into a shape tailored to a shape of the position detection mark portion of a resin part. Further, a bottom portion of the concave portion is formed with a high surface nature and a predetermined angle, and thus, when emitted light from a tray position sensor disposed on the carriage is reflected by a part other than the position detection mark, the reflected light does not return a light receiving unit. Accordingly, erroneous detection can be prevented in position detection of the tray.

A thickness and a material of the tray fitted with the adapter are similar to the above-described thickness and material of the tray fitted with the disk medium. In addition, the tray fitted with the adapter is also provided with the above-described tray sheet and position detection mark, and the tray conveying unit 316 conveys the tray fitted with the adapter similarly to when conveying the tray for the disk medium. Further, the tray conveying unit 316 may be detachable to the printer by a user or mounted in the printer in advance.

<Block Diagram of Software>

Figure 4:
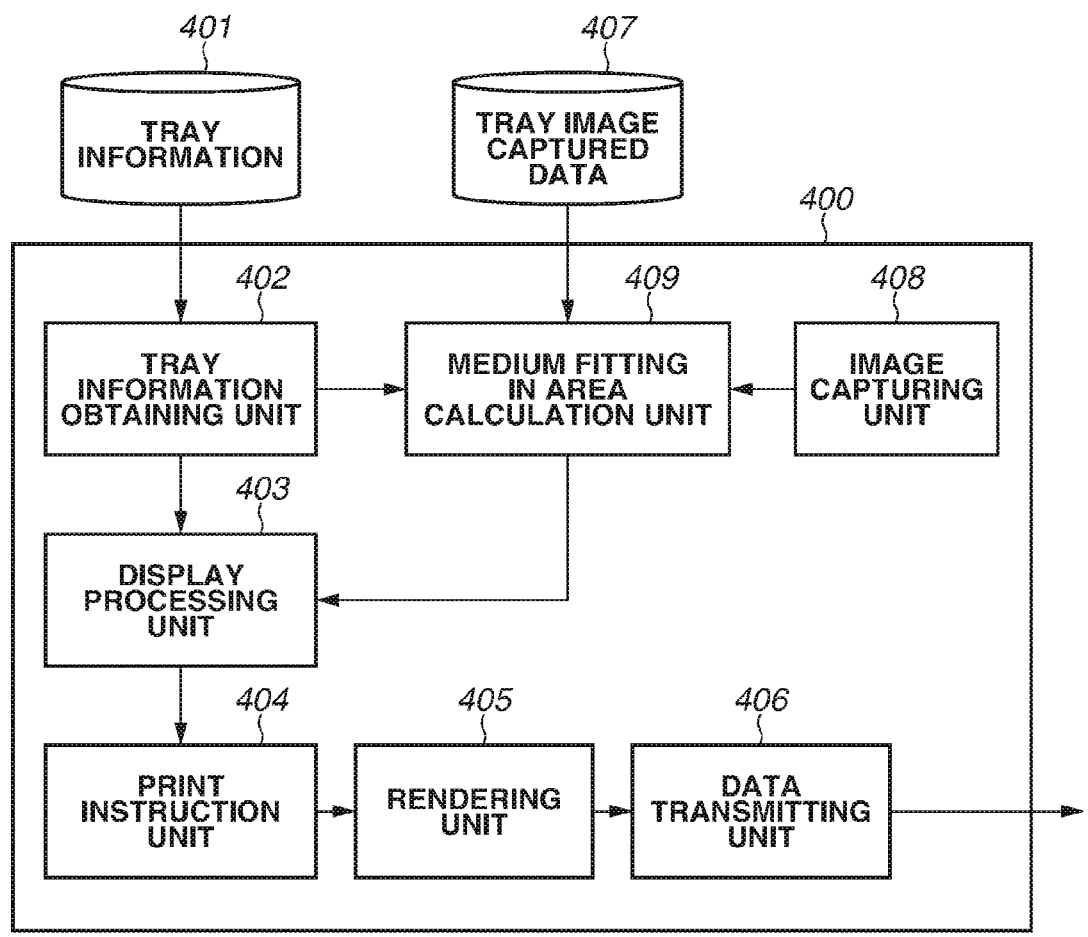
FIG. 4 is a block diagram illustrating a software configuration of an image processing apparatus according to one of more aspects of the present disclosure.

FIG. 4 is a block diagram illustrating a software configuration of the image processing apparatus 100 according to the present exemplary embodiment. The image processing apparatus 100 includes, for example, a personal computer, a smartphone, and a tablet PC and performs various types of processing including image display processing and communication processing.

The application program 400 is stored in the ROM 103 of the image processing apparatus 100. Each block included in the application program 400 corresponds to a program module and one of various functions of the application program 400. The CPU 102 executes the application program 400 stored in the ROM 103 on the RAM 104 and thus can be operated as the function represented by each block in the application program 400.

Items 401 to 409 in FIG. 4 correspond to functions that the image processing apparatus 100 transmits the print data to the printer 114 to perform printing. Tray information 401 is information regarding a tray fitted with the printing medium on which printing is performed. Specifically, the tray information 401 is the information indicating a size and a shape of a conveyance tray 800 described below and a shape of a portion (an adapter tray fitting-in portion 801 described below) to which the adapter is fitted in the conveyance tray 800. Further, identification (ID) information from which a type of the tray can be determined is recorded in a bar code, a two-dimensional code, and the like on the tray, and the image processing apparatus 100 may obtain the tray information 401 by reading the above-described ID information. Further, the image processing apparatus 100 stores information associating the type of the tray with the size and the shape thereof. The image processing apparatus 100 may determine the type of the tray from the obtained tray information 401 and specify the size and the shape of the tray according to the determined type. The above-described ID information is described with reference to FIGS. 5A and 5B.

Figure 5A:
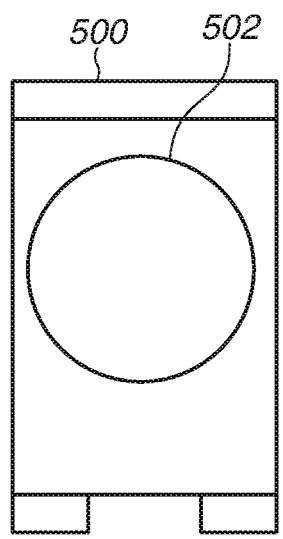
FIGS. 5A and 5B illustrate examples of disk trays according to one of more aspects of the present disclosure.
Figure 5B:
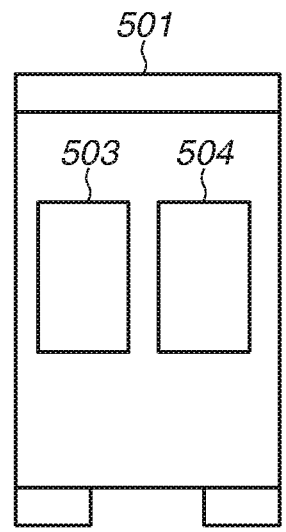

FIGS. 5A and 5B illustrate examples of the disk trays. For example, FIG. 5A illustrates a tray 500 dedicated to a disk medium having a circular print area such as a CD and a DVD. FIG. 5B illustrates a tray 501 dedicated to a card having a rectangular print area such a card and a name card.

An area 502 in FIG. 5A is an area to which the disk medium is fitted, and areas 503 and 504 in FIG. 5B are areas to which media such as cards are fitted.

As illustrated in FIGS. 5A and 5B, a plurality of types of the trays can be mounted to the printer 114 for performing printing on media having different shapes. Therefore, a code storing the type of the tray in the ID information (an ID number and the like) as tray information is provided on the tray. The ID information pieces such as a shape and a size of a printable area of each tray, the number of media to be fitted in, information indicating a print start position, and information indicating a non-printable area are recorded as the tray information 401.

A tray information obtaining unit 402 is a processing unit for obtaining the tray information 401 to a memory in the image processing apparatus 100. As described above, for example, the tray information 401 in the code on the tray is read by the image processing apparatus 100 or an external apparatus. The tray information obtaining unit 402 obtains the information from the memory which stores the read tray information 401. The tray information 401 is stored in the outside of the image processing apparatus 100 but may be stored in the memory of the image processing apparatus 100. Alternatively, the information may be stored in a memory of a server via a communication line.

For example, the tray information obtaining unit 402 determines an apparatus from which the information is obtained in advance, and in the case of the memory of the image processing apparatus 100, the tray information obtaining unit 402 has data access to the memory to obtain the information. Whereas, when the tray information is stored in the server connected to the image processing apparatus 100 via a communication line, the tray information obtaining unit 402 has access to the server via the communication line. The tray information obtaining unit 402 has access to a file including the tray information and obtains a tray information file. The tray information obtaining unit 402 obtains the tray information from the obtained tray information file.

When the tray information is stored in a printer connected to the image processing apparatus 100 via the communication line, the tray information obtaining unit 402 connects to the printer via the communication line. When tray information obtaining processing is transmitted to the printer side, the tray information stored in the printer is transmitted to the image processing apparatus 100 and obtained.

Tray image captured data 407 is image data of an image of the try according to the present exemplary embodiment captured by the image capturing device. For example, when the printer 114 includes a printer and a scanner as in the case of a multifunction printer (MFP), the printer 114 may operate as the image capturing device. A user causes the scanner of the printer 114 to read the tray to generate an image. The image may be obtained as the tray image captured data 407 by the CPU 102 from the printer 114 via the IF 109.

When the image processing apparatus 100 includes a camera unit, the image processing apparatus 100 may operate as the above-described image capturing device and capture an image of the tray. Specifically, the CPU 102 can cause the camera unit to execute image capturing by executing an image capturing unit 408. When a user captures an image of the tray by the camera using the function, the CPU 102 also executes the image capturing unit 408 and converts the captured data into an image format to generate an image.

The CPU 102 executes a function of a medium fitting-in area calculation unit 409 based on the above-described tray image captured data 407 and data of the tray captured by the image capturing unit 408. The medium fitting-in area calculation unit 409 calculates an area in which the medium is fitted (i.e., medium fitting-in area) in the tray from the tray image capturing data captured by the image capturing device. In other words, the medium fitting-in area calculation unit 409 specifies a shape and a size of the area in which the medium is fitted based on the image in which the tray is captured. The medium fitting-in area calculation unit 409 may specify only one of the shape and the size of the area.

When specifying the size of the medium fitting-in area, the CPU 102 obtains the tray information 401 and the size information of the tray in advance. The CPU 102 specifies the medium fitting-in area in the image in which the tray is captured and compares the size of the medium fitting-in area and the size of the tray in the captured image. Subsequently, the CPU 102 specifies the size of the medium fitting-in area by referring to the comparison of both sizes and the size information of the tray.

The medium fitting-in area calculation unit 409 generates template information representing a template for arranging an image and a character of a print target based on the shape of the medium fitting-in area.

A display processing unit 403 displays information of an image and a character used in the print processing on the display 106. The display processing unit 403 performs display indicating the shape of the medium fitting-in area in the tray based on the template information generated by the medium fitting-in area calculation unit 409 and the tray information 401. For example, the display processing unit 403 displays a print preview image in which the print target image is fitted in the area of that shape.

The display processing unit 403 has a function of displaying a screen on which a button for selecting the information of the image and the character used in the print processing and the like are arranged. The display processing unit 403 further has a function of displaying a print setting list for printing and displaying a screen on which a button for selecting a condition from the print setting list and the like are arranged. The display processing unit 403 further has a function of displaying the tray information 401 obtained by the tray information obtaining unit 402.

Figure 6:
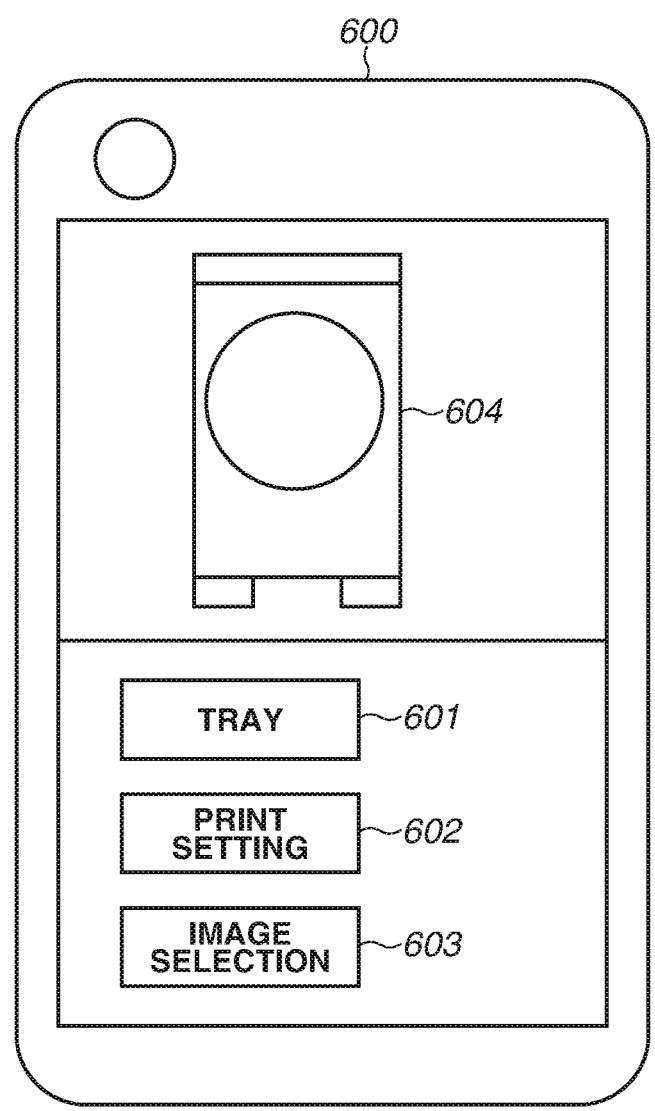
FIG. 6 illustrates a display on a display processing unit of a smartphone as an image processing apparatus according to one of more aspects of the present disclosure.

FIG. 6 illustrates a display by the display processing unit 403 in a smartphone 600 as the image processing apparatus 100. On a display of the smartphone 600, a tray selection button 601, a print setting button 602, and an image selection button 603 are displayed.

When a user selects the tray selection button 601, a tray selectin dialogue is activated, and a plurality of the tray information pieces obtained by the smartphone 600 is displayed. For example, information as an image of a tray shape is displayed. When a user selects the print setting button 602, a print setting dialogue is activated, and registered printer information, a print sheet setting, and the like can be selected. When a user selects the image selection button 603, an image selection dialogue is activated, and an image can be selected from images stored in the smartphone or by shifting to a camera image capturing operation and selecting a captured image.

The display processing unit 403 further displays an image in which the image is fitted in the tray according to the selected tray, the print setting, and the selected image on a preview 604. When a user select an image and fits the image in the tray, the shape of the fitting-in area on the display is changed by moving the image and by changing magnification thereof, and thus the image is fitted in the displayed area. As described above, the display processing unit 403 has a function of displaying information regarding printing by fitting the print medium in the tray.

A print instruction unit 404 is a processing unit for instructing a print setting for transmitting an instruction of the print setting, the image data of the print target, and the like from the image processing apparatus 100 to the printer 114.

For example, when the print setting button 602 in FIG. 6 is selected, a print setting dialogue screen is activated. In the print setting dialogue screen, for example, display of a printer name connected to the network and selection of the printer is performed. Further, print setting information pieces including a sheet size such as a CD, A4, and a large size, specification of the number of copies, and a type of a sheet such as a plain paper, glossy paper, and CD dedicated paper are specified. The above-described print setting information may be stored in advance in a mobile terminal such as the smartphone or downloaded from the server and the printer via the network.

In addition, a print button is displayed on the print setting dialogue screen. When a user selects the print button, the print instruction unit 404 instructs a rendering unit 405 to generate the print target image based on the print setting information. Further, the print instruction unit 404 notifies a data transmitting unit 406 of the printer selected by the user via the rendering unit 405. Upon receiving the instruction from the print instruction unit 404, the rendering unit 405 generates the print data corresponding to the above-described print setting. The data transmitting unit 406 transmits the print data generated by the rendering unit 405 to the printer instructed by the print instruction unit 404.

A configuration of each unit is described in detail below.

The print instruction unit 404 selects information necessary for printing from the list displayed by the display processing unit 403, specifies the print setting information, and issues a print instruction in response to a user instruction. The rendering unit 405 generates the print data using the print setting information selected by the print instruction unit 404 based on the tray information 401 and the information of the image and the character selected and displayed by the display processing unit 403. The rendering unit 405 generates the print data, for example, in which an image is arranged in the print area. Specifically, the tray information 401 includes a print content area indicating a size and a position of the print area, and the rendering unit 405 renders an image based on the size and the position indicated by the tray information 401. As information indicating the size and the position of the print area, for example, scalable vector graphics (SVG) is used.

The SVG is one of description methods for displaying a graphic which can be used in a Web standard language. An example of the tray information 401 described in the SVG is described below.

```
<svg width = "a lateral width of a print content" height =
"a longitudinal width of the print content">
<image xlink:href = "specification of an image file"
width = "a lateral width of a picture"
height = "a longitudinal width of the picture"
x = "an x coordinate of the picture"
y = "a y coordinate of the picture"/>
</svg>
```

As described above, the SVG is character strings in which drawing commands of the graphic are listed and displayed on a user interface (UI) by being interpreted by an interpreter.

In order to print the above-described print content, generally the print content is required to be converted into high-resolution image data (i.e., bitmap data) required by a printer engine in the printer. This processing is rendering processing executed by the rendering unit 405. The high-resolution image data subjected to the rendering processing is regarded as print data.

The rendering processing such as the SVG is not limited to the above-described one as long as an image in which an image and a character are arranged in a content area can be obtained.

For example, a method for rendering and capturing a screen using a technique known in HyperText Markup Language (HTML) and Cascading Style Sheets (CSS) may be used. Further, data obtained by converting the high-resolution image data into a Joint Photographic Experts Group (JPEG) format may be used as the print data. Furthermore, data converted into a Portable Document Format (PDF) format using the PDF technique may be used as the print data.

The data transmitting unit 406 is connected to the printer 114 via the communication line, converts the print data into a format receivable by the printer 114, and transmits the print data to the printer 114. For example, the image processing apparatus 100 and the printer 114 is connected by Wireless Fidelity (WiFi) technique for connecting devices by wireless radio waves. The image processing apparatus 100 transmits the print setting information to the printer 114 as a print command. The image processing apparatus 100 also transmits, for example, a JPEG file after rendering to the printer 114 as the print data to be printed by the print command.

Another method may be used as a method for transmitting the print data from the image processing apparatus 100 to the printer 114. For example, the image processing apparatus 100 is connected to the printer 114 using a Universal Serial Bus (USB) port. The image processing apparatus 100 uses a printer driver to convert the print data into raster data printable by the printer 114. The image processing apparatus 100 transmits the printable raster data to the printer 114 via the USB port. The printer 114 converts the received raster data to printable data and performs printing.

FIG. 7 is a block diagram illustrating a software configuration of a print control device according to the present exemplary embodiment.

A print control device 700 in the printer 114 in FIG. 7 receives the print data and causes the printing unit 315 in the printer 114 to execute printing. The print control device 700 may be included in the control circuit unit 203 or have another configuration.

Units 701 to 703 in FIG. 7 illustrate functions of the print control device 700 for receiving the tray image captured data 407 from the image processing apparatus 100 and executing printing on a printing medium 705 as a block diagram.

A data receiving unit 701 receives the print data transmitted from the image processing apparatus 100. For example, the data receiving unit 701 receives the print command and a JPEG image after rendering. The data receiving unit 701 analyzes the received print command and transmits the print setting information such as the analyzed sheet size and sheet type to an image processing unit 702. Further, the data receiving unit 701 converts the received JPEG file into image data by performing decoding processing and transmits the converted image data to the image processing unit 702.

The image processing unit 702 performs image conversion processing on print image data based on the print setting information and the image data received from the data receiving unit 701. For example, it is assumed that input image data received from the data receiving unit 701 has 1000*1000 pixels. When the print setting information includes a sheet size as a DVD size of 120*120 mm and print resolution of 600 dpi, output image data will have 2834*2834 pixels.

The image processing unit 702 performs processing to change magnification of the input image data (1000*1000 pixels) received from the data receiving unit 701 to the output image data (2834*2834 pixels). The magnification processing includes nearest neighbor, bilinear, and bicubic methods, and the method may be appropriately selected by considering characteristics of the method and processing speed.

The image processing unit 702 performs processing for converting the input image data into the output image data for printing based on the print setting information. When the print setting information includes correction processing information, the image processing unit 702 executes correction processing on the input image data or the output image data. Image correction includes various types of processing such as brightness adjustment to brighten or darken entire color, contrast adjustment, color balance adjustment, and backlight correction and red-eye correction assuming photographic print.

A print processing unit 703 is a processing unit for converting the output image data received from the image processing unit 702 into print output data for printing. The print processing unit 703 performs conversion processing so that suitable color can be obtained when the print output data is output by the printing apparatus.

A method for converting into the print output data is not limited to the above-described one as long as known color conversion processing for converting an image format used for screen display into ink colors for printing. For example, four colors of cyan (C), magenta (M), yellow (Y), and black (K) are assumed as ink colors of the print processing apparatus. Three colors of red (R), green (G), and blue (B) generated by the image processing unit are converted into the four ink colors of C, M, Y, and K. When the conversion is performed, a color separation table is used. The color separation table is a table which can convert three input density values of R, G, and B into density values of the ink colors of C, M, Y, and K. The density values of R, G, and B are converted into the density values of the ink colors of C, M, Y, and K for each pixel of the output image data using the color separation table.

The print processing unit 703 performs image processing such as output gradation correction and half toning using image processing parameters such as a look-up table and converts the image data into printable data. Further, the print processing unit 703 can control the sheet conveying unit 311 and the tray conveying unit 316 to convey the sheet or the tray and control the printing unit 315 to eject the ink from the printing head 201. According to the above-described configuration, the print processing unit 703 prints an image based on the image data converted as described above to the printing medium 705 which is the various printing media fitted in the tray or a sheet.

Processing for performing printing corresponding to various printing media according to the present exemplary embodiment is described below.

<Tray Configuration>

Figure 8A:
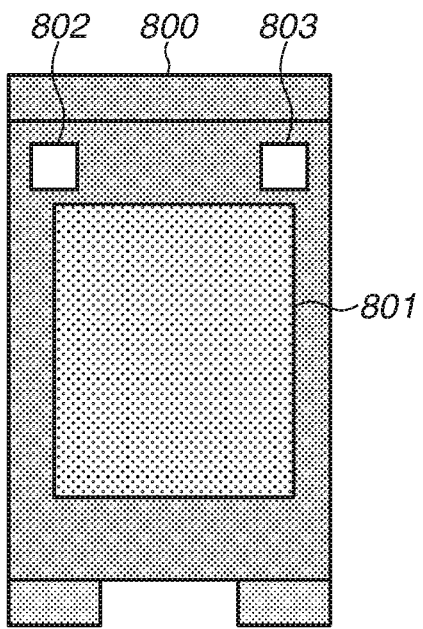
FIGS. 8A to 8C illustrate trays to which a medium is fitted in to be printed according to one of more aspects of the present disclosure.
Figure 8B:
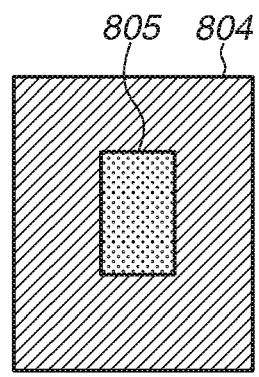
Figure 8C:
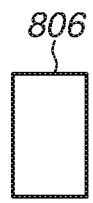

The tray according to the present exemplary embodiment is described with reference to FIGS. 8A to 8C. FIGS. 8A to 8C illustrate the trays for fitting a medium therein and performing printing. FIG. 8A illustrates a conveyance tray, FIG. 8B illustrates an adapter tray to be fitted in the conveyance tray, and FIG. 8C illustrate a medium to be fitted in the adapter tray.

In FIG. 8A, the conveyance tray 800 includes the adapter tray fitting-in portion 801. The conveyance tray 800 further includes reflection plates 802 and 803 for performing position adjustment. In FIG. 8B, an adapter tray 804 includes a medium fitting-in portion 805. FIG. 8C illustrates a medium 806 which is fitted in the medium fitting-in portion 805 in the adapter tray 804. The conveyance tray 800 is inserted into the tray conveying unit 316 of the printer 114, and conveyance of the conveyance tray 800 is executed.

The conveyance tray 800 is engaged between the conveying roller and the pinch roller, and thus a conveyance force is generated. When a material of the conveyance tray 800 is the one which changes a shape when being conveyed by the rollers, quality of conveyance is deteriorated. Therefore, the conveyance tray is formed by a hard member such as plastic having thickness.

The adapter tray 804 is fitted in the adapter tray fitting-in portion 801 in the conveyance tray 800. The adapter tray 804 includes the medium fitting-in portion 805 to be fitted with a printing medium. The medium fitting-in portion 805 illustrated in FIG. 8B is fitted with a rectangular printing medium such as a card. However, the shape of the medium fitting-in portion 805 is not limited to the rectangle and may be various shapes such as a circular shape, an elliptical shape, and a polygonal shape other than rectangle.

As the information stored in advance as the above-described tray information 401, the information pieces indicating the shape and the size of the adapter tray 804 are stored, however, information of the medium fitting-in portion 805 is not stored. In other words, the image processing apparatus 100 cannot recognize which position in the tray the medium is fitted in even referring to the tray information 401.

According to the present exemplary embodiment, the image processing apparatus 100 is characterized as calculating the medium fitting-in area by analyzing the image capturing the adapter tray. An adapter template is generated according to the thus calculated medium fitting-in area. The image processing apparatus 100 uses the generated adapter template as the tray information in the display or printing and thus can perform displaying and printing corresponding to various media.

A method for calculating the medium fitting-in area is described in detail below with reference to a flowchart in FIG. 9.

<Adapter Tray Template Generation Processing>

FIG. 9 is a flowchart illustrating adapter tray template generation processing. According to the present exemplary embodiment, an adapter tray template reflecting an arbitrary medium fitting-in area which is not stored in advance is generated. Procedures for generating the template reflecting an arbitrary medium fitting-in area which is not stored in advance are described with reference to the flowchart in FIG. 9.

The processing illustrated in FIG. 9 is realized by the CPU 102 executing a program stored in the ROM 103. Specifically, the CPU 102 executes the application program 400 stored in the ROM 103 or the secondary storage device 105 and operates as each function in FIG. 4, and thus the processing illustrated in FIG. 9 is realized.

The processing illustrated in FIG. 9 is started when the application program 400 is activated or when printing of the adapter tray is instructed by a user on a screen displayed after the start up.

In step 901, the CPU 102 operates as the tray information obtaining unit 402 and obtains a shape of the adapter tray fitting-in portion 801 to be fitted with the adapter tray in the conveyance tray 800 as the tray information 401. The tray information 401 indicates, for example, sizes of longitudinal and lateral sides of the adapter tray 804 and a position and a size of a printable area in the adapter tray 804.

As a method that the CPU 102 obtains the adapter tray information in step 901, the tray information 401 stored in advance in the image processing apparatus 100 may be obtained. The CPU 102 may obtain the tray information 401 stored in the printer 114 via the IF 109. The CPU 102 may obtain the tray information 401 stored in the external server 116 and the like by the wireless LAN communication unit 111 via the Internet 115 and the wireless LAN. Further, the CPU 102 may obtain the tray information 401 from information of a quick response (QR) code (a registered trademark) described on the adapter tray 804.

In step 902, the CPU 102 captures an image of the adapter tray by the image capturing unit 408 and obtains an adapter tray image. The CPU 102 executes the application program 400 and displays, for example, a message prompting for capturing an image of the adapter tray and a button for image capturing on the display 106. When a user presses the button, the application program 400 instructs the OS to capture an image, and the internal image capturing device 112 performs image capturing. The application program 400 obtains an image captured in the image capturing via the OS.

In step 903, the CPU 102 operates as the medium fitting-in area calculation unit 409 and specifies the image area corresponding to the adapter in the adapter tray image data obtained in step 902 based on the tray information 401 obtained in step 901. The processing is described in detail below.

The CPU 102 refers to the shape of the conveyance tray 800 indicated by the tray information 401 to specify the image area corresponding to the conveyance tray 800 in the image based on the adapter tray image data. Further, the CPU 102 specifies the image area corresponding to the adapter tray fitting-in portion 801 in the image area corresponding to the specified conveyance tray 800 based on the position of the adapter tray fitting-in portion 801 in the conveyance tray 800 indicated by the tray information 401.

In step 903, the CPU 102 further specifies an actual size of the adapter tray fitting-in portion 801. Specifically, the CPU 102 specifies a ratio of sizes of the image area corresponding to the conveyance tray 800 to the image area corresponding to the adapter tray fitting-in portion 801 in the adapter tray image data. Further, the CPU 102 specifies the actual size of the adapter tray fitting-in portion 801 from an actual size of the conveyance tray 800 indicated by the tray information 401 and the above-described ratio. For example, image capturing resolution when the adapter tray is captured may be different in some cases, so that even if the size of the image area of the conveyance tray 800 or of the adapter tray fitting-in portion 801 in the adapter tray image data can be specified, the actual size thereof cannot be determined. Thus, according to the present exemplary embodiment, the actual size of the conveyance tray 800 indicated by the tray information 401 and the ratio of the size of the conveyance tray 800 to the size of the adapter tray fitting-in portion 801 in the image are referred to. Accordingly, the actual size of the adapter tray fitting-in portion 801 can be appropriately obtained.

In step 904, the CPU 102 operates as the medium fitting-in area calculation unit 409 and specifies a position (coordinates) used at the time of printing is specified as a size and a shape of the medium fitting-in portion 805 in the adapter tray fitting-in portion 801. Specifically, the CPU 102 specifies the position (the coordinates) of the medium fitting-in portion 805 based on the shape and the actual size of the adapter tray fitting-in portion 801 specified in step 903. The processing is described in detail below.

First, the CPU 102 specifies the image area corresponding to the medium fitting-in portion 805 in the above-described image area corresponding to the adapter tray fitting-in portion 801 in the adapter tray image and specifies a shape of the image area as a shape of the medium fitting-in portion 805.

Specifically, the CPU 102 analyzes a color and an edge of the above-described image area corresponding to the adapter tray fitting-in portion 801. For example, it is assumed that the printable area of the adapter tray is black, and the medium fitting-in area 805 is hollowed out. In this case, the adapter tray is captured in an image in which the adapter tray portion is in black, and the medium fitting-in area is in a background color (for example, white). The CPU 102 determines the area captured in white as the image area of the medium fitting-in portion 805. The medium fitting-in portion 805 may be in white without being hollowed out. In this case, in step 902, a message for prompting a user to capture an image without fitting a medium in the medium fitting-in portion 805 may be displayed.

Figure 10A:
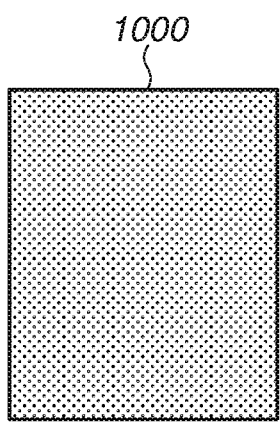
FIGS. 10A to 10C illustrate coordinate transformation of an adapter tray image according to one of more aspects of the present disclosure.
Figure 10B:
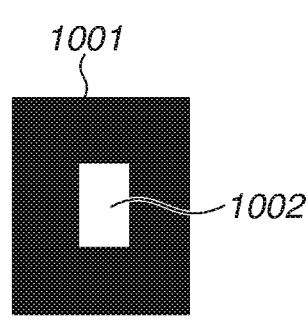
Figure 10C:
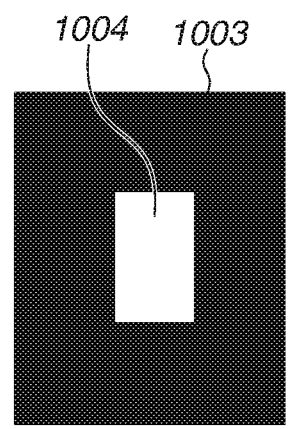

When the image area corresponding to the medium fitting-in portion 805 is specified as described above, next, the CPU 102 specifies a position (coordinates) of the medium fitting-in portion 805 based on the image area and the actual size of the adapter tray fitting-in portion 801 specified in step 903. Specification of the position (the coordinates) of the medium fitting-in portion 805 is described with reference to FIGS. 10A to 10C. FIGS. 10A to 10C illustrate coordinate transformation of the adapter tray image. FIG. 10A illustrates the shape and the actual size of the adapter tray fitting-in portion 801 specified in step 903 (adapter tray information 1000). FIG. 10B illustrates an image of the image area of the adapter tray fitting-in portion 801 specified in step 903 (an adapter tray image 1001).

For example, it is assumed that a short side and a long side of the adapter tray information 1000 in FIG. 10A are respectively 127 mm and 169 mm as the actual size of the adapter tray fitting-in portion 801. Further, it is assumed that the print resolution is 600 dpi. Accordingly, it can be understood that the short side and the long side of the adapter tray fitting-in portion 801 respectively correspond to 3000 pixels and 4000 pixels as the pixel numbers at the time of printing.

It is assumed that the short side and the long side of the adapter tray image 1001 in FIG. 10B respectively have 1500 pixels and 2000 pixels. As an example according to the present exemplary embodiment, the coordinates in the adapter tray image 1001 are adjusted to the number of pixels. Specifically, it is assumed that an upper left origin of the adapter tray image 1001 has coordinates (X, Y)=(0, 0), and a lower right corner of the adapter tray image 1001 has coordinates (X, Y)=(1500, 2000). It is assumed that the short side and the long side of the medium fitting-in area 1002 respectively have 500 pixels and 1000 pixels, and the medium fitting-in area 1002 is arranged at the center of the adapter tray image 1001.

In this case, the CPU 102 can determine that the upper left origin of the medium fitting-in area 1002 has coordinates (X, Y)=(500, 500). As described above, it can be understood that the short side and the long side of the adapter tray fitting-in portion 801 respectively correspond to 3000 pixels and 4000 pixels as the number of pixels at the time of printing. Thus, when the number of pixels at the time of printing and the coordinates are matched, the adapter tray image 1001 is enlarged twice in the longitudinal and lateral sides, and the coordinates of the medium fitting-in portion 805 when printing is performed in the print resolution of 600 dpi can be obtained.

FIG. 10C illustrates the adapter tray image 1003 after the coordinate transformation. The medium fitting-in area 1004 is converted from the coordinates of the medium fitting-in area 1002 to the coordinates enlarged twice in the longitudinal and lateral sides. In other words, the short side and the long side of the medium fitting-in area 1004 respectively have 1000 pixels and 2000 pixels, and the upper left origin of the medium fitting-in area 1004 has the coordinates (X, Y)=(1000, 1000). Similarly, the coordinates of all pixels in an area of a medium fitting-in portion 1004 (a white area in FIG. 10C) are specified.

In step 905, the CPU 102 generates an image indicating the position (the coordinates) of the medium fitting-in portion 1004 specified in step 904 as the adapter tray template. As a method for generating the adapter tray template, for example, the CPU 102 generates image information including a predetermined pixel value as a black area and transparent information as the white area in FIG. 10C as an adapter tray template image. A format of the adapter tray template may be a format which can handle the calculated medium fitting-in area arranged on the adapter tray as the transparent information. For example, the template is generated in an image format like a portable network graphics (PNG). The PNG format is a format which can handle the transparent image information, and thus the CPU 102 can generate a PNG file in which the entire adapter tray is defined as an image, and the medium fitting-in area is defined as a transparent image. Further, for example, the PDF is also a format which can handle the transparent image information. Thus, the CPU 102 can generate a PDF file in which the medium fitting-in area is defined as the transparent information as the adapter tray template.

In step 905, when the adapter tray template is generated, the processing illustrated in FIG. 9 is terminated.

The adapter tray template generated by the processing illustrated in FIG. 9 can be used for printing or displaying corresponding to the shape and the size of the medium fitting-in portion 805.

As described above, the number of pixels of the print resolution (for example, 600 dpi) assumed in the image processing apparatus 100 matches with the coordinates. Therefore, when the image processing apparatus 100 performs printing in the relevant print resolution, the print target image is rendered according to the coordinates of the medium based on the upper left of the adapter tray fitting-in portion 801, and thus printing is appropriately performed on the area on the medium.

For example, when the resolution different from the one (600 dpi) assumed as the print resolution is used in the printing, the CPU 102 performs the coordinate transformation according to the resolution. For example, when the print resolution is 1200 dpi or 300 dpi, the coordinate value indicated by the adapter tray template is doubled or halved respectively in the longitudinal and lateral sides, and accordingly the coordinates corresponding to the print resolution can be calculated.

In addition, the adapter tray template generated in step 905 may be used for not only printing but also displaying. Specifically, the CPU 102 performs the coordinate transformation according to the display resolution with respect to the coordinates indicated by the adapter tray template and thus can display the shape of the medium fitting-in portion 805 on the display 106. For example, a user selects a print target image to be printed on a medium fitted in the medium fitting-in portion 805 from images stored in the secondary storage device 105. The CPU 102 adjusts the adapter tray template to the size of the print target image and displays the adapter tray template by overlapping on the relevant image on the display 106. Then the medium fitting-in area is transparent, and thus a portion to be printed on the medium fitted in the medium fitting-in portion 805 in the print target image is indicated to the user.

The CPU 102 may correct the captured adapter tray image. For example, lengths of an upper side and a lower side of the adapter tray are supposed to be the same, however, the both sides may be different in a captured image in some cases when the image is captured by inclining the conveyance tray 800. Thus, the CPU 102 may perform image processing so that the adapter tray image has a rectangle shape of which the upper side and the lower side are the same and then specify the position (the coordinates) of the medium fitting-in portion 1004.

In step 902 in FIG. 9, the method for capturing an image of the adapter tray by the internal image capturing device 112 is described as the example of the method for obtaining image data of the adapter tray. For example, the smartphone as the example of the image processing apparatus 100 captures an image using a camera function. In this case, a marker for facilitating image capturing of the adapter tray may be arranged in the screen display of the smartphone to cause a user to capture an image by falling the adapter tray within the marker.

The image of the adapter tray is not limited to be captured by the internal image capturing device 112 and may be captured by the external apparatus and input as the tray image captured data 407. For example, when the printer 114 is an MFP including a scanner, a user places the adapter tray on a document platen of the scanner included in the printer 114, the adapter tray is scanned, and image data obtained by scanning may be obtained as the tray image captured data 407. For example, in step 902, the CPU 102 displays a message for prompting a user to scan the adapter tray and a button for scanning on the display 106. When a user inputs an instruction by the button, the CPU 102 may cause the printer 114 to execute scanning via the IF 109 and input the image data obtained by the scanning as the tray image captured data 407 via the IF 109. When a size of the adapter tray is within an A4 size, a scanner which can capture an A4 equivalent size can capture an image of the adapter tray. The scanner performs clip processing and detects an area corresponding to the adapter tray from the image obtained by reading an entire document platen of the scanner. Further, the scanner converts the detected area into image data of JPEG and the like and transmits the data to the image processing apparatus 100.

A method that the printer 114 scans the adapter tray is not limited to the above-described one. For example, similar to the processing that the printer 114 executes the tray print, the tray conveying unit 316 may convey the conveyance tray 800 and capture an image of the conveyed conveyance tray 800 using an optical sensor such as the scanner. Further, the printer 114 may generate image data of the adapter tray by the above-described clip processing and transmit the image data to the image processing apparatus 100.

Regarding an image reading sensor such as a scanner, a distance between the image reading sensor and an object (the conveyance tray 800) placed on the document platen is almost constant. In that case, the actual sizes of the adapter tray fitting-in portion 801 and the medium fitting-in portion 805 can be specified from the number of pixels of the medium fitting-in portion 805 in the read image and reading resolution. In other words, if the reading resolution is 300 dpi, and the number of pixels of the image area of the adapter tray fitting-in portion 801 in the read image are 1200 pixels in the longitudinal and lateral sides, it can be understood that the actual size of the adapter tray fitting-in portion 801 is four inch each in the longitudinal and lateral sides. Thus, when the scanner reads the conveyance tray 800, information of the actual size of the conveyance tray 800 indicated by the tray information 401 may not be used.

As a method for specifying the image area of the adapter tray fitting-in portion in the captured image, a following method may be used. A mark (for example, a cross mark) for specifying the image area may be arranged on four corners of the adapter tray fitting-in portion 801, and the CPU 102 may detect the cross marks from the adapter tray image and thus specify the image area of the adapter tray fitting-in portion.

Further, in step 903 in FIG. 9, the actual size of the adapter tray fitting-in portion is specified from the actual size of the tray indicated by the tray information 401. However, the configuration is not limited to the above-described one, and when the size of the adapter tray fitting-in portion is fixed, the tray information 401 may indicate the actual size of the adapter tray fitting-in portion.

If the actual size of the adapter tray fitting-in portion is not specified in step 903, the coordinates of the medium fitting-in area specified in step 904 may be converted into the coordinates of the entire the conveyance tray. Further, the actual size of the medium fitting-in area may be specified from the coordinates and the actual size of the adapter tray.

The example is described above in which the shape and the size of the medium fitting-in area are specified by the captured image. However, the configuration is not limited to the above-described one, and image capturing may be performed in a state in which a printing medium is fitted in the medium fitting-in area, and a shape and a size of the printing medium may be specified by performing the processing similar to that on the medium fitting-in area illustrated in FIG. 9 on an area of the printing medium in the captured image.

Next, display processing and print processing are described in detail as output methods of an image using the adapter tray template.

<Display Processing>

The preview 604 in FIG. 6 is an example when the smartphone 600 as the image processing apparatus 100 displays the adapter tray template. As described above, a user can selects an arbitrary image as a print target, and the smartphone 600 can display the template on a front side and the image on a rear side as a print preview. A transparent portion of the template corresponds to the medium fitting-in area, so that, when an image is placed on the transparent portion, the image is displayed in a state in which only a transparent portion thereof is clipped. For example, in the preview 604 in FIG. 6, a circular area in the adapter area corresponds to the medium fitting-in portion. Only a part of a circular area in the image selected by the use is displayed in the above-described circular area in FIG. 6.

According to the above-described exemplary embodiment, even if the information about the shape of the medium fitting-in portion 805 is not stored in advance, the image processing apparatus 100 can specify the shape of the medium fitting-in portion 805 by generating the adapter tray template by the processing illustrated in FIG. 9.

For example, there is a case that a user freely changes a shape of the medium fitting-in area in the printable area in the adapter tray, and the image processing apparatus 100 does not store in advance information indicating the changed shape. According to the above-described exemplary embodiment, even in such a case, the medium fitting-in area is specified from the image in which the tray is captured and used in display, and thus the user can recognize which area in the print target image is printed on the medium.

<Print Processing>

In the image processing apparatus 100, the print instruction unit 404 does not store the medium fitting-in area in advance but stores the adapter tray to be used in advance, so that an entire area of the adapter tray is set as the printable area.

The rendering unit 405 stores a state that the image is fitted in the template as image data based on the generated template and the selected image. In this case, a transparent area of the template is only formed as an image and a non-transparent area other than that is regarded as, for example, white data.

The image data consisting of white pixels in the adapter tray portion and pixels of the image in which the transparent area is transmitted therethrough is converted to the tray image captured data 407 by the data transmitting unit 406 and transmitted to the print control device 700.

The print control device 700 may be configured not to eject the ink to the white pixel data and thus can eject the ink only to the pixels of the transparent image, namely the medium fitting-in area in the adapter tray.

<Effect of Present Exemplary Embodiment>

As described above, according to the present exemplary embodiment, the shape and the actual size of the medium fitting-in portion 805 are specified based on the captured image of the tray, and the coordinates of the medium fitting-in portion 805 are specified according to the predetermined print resolution. The CPU 102 renders the image data of the print target in the RAM 104 so that the image data is arranged only on the coordinates of the medium fitting-in portion indicated by the adapter tray template and transmits the image data to the printer 114 via the IF 109 to print.

Therefore, the image processing apparatus 100 can cause the printer 114 to execute printing tailored to the shape and the size of the medium fitted in the medium fitting-in portion 805 even if the information about the shape and the size of the medium fitting-in portion 805 are not stored in advance.

In other words, a user can freely mount a medium on the tray in which the medium fitting-in area is set and execute printing.

In FIGS. 10A to 10C, the examples are described when the medium fitting-in portion has a rectangular shape, however, the processing according to the present exemplary embodiment can be applied to the medium fitting-in portions having various shapes.

Figure 11A:
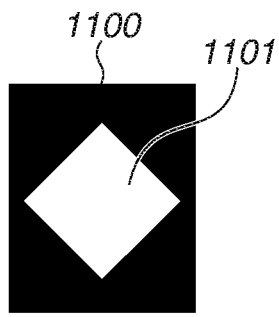
FIGS. 11A to 11C illustrate other examples of adapter trays according to one of more aspects of the present disclosure.
Figure 11B:
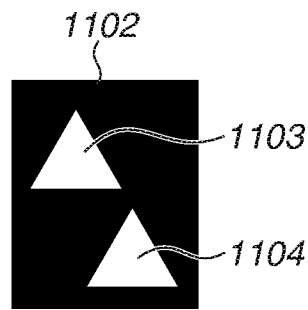
Figure 11C:
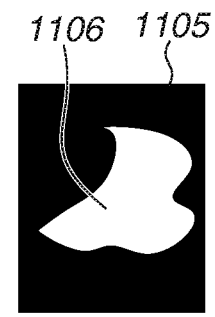

FIGS. 11A to 11C illustrate other examples of the adapter trays. FIG. 11A illustrates an adapter tray 1100 in which a medium fitting-in area 1101 has a lozenge shape. FIG. 11B illustrates an adapter tray 1102 in which two medium fitting-in areas 1103 and 1104 have triangular shapes. FIG. 11C illustrates an adapter tray 1105 in which a medium fitting-in area 1106 has a free shape.

Even if the various medium fitting-in portions illustrated in FIGS. 11A to 11C are set, the medium fitting-in areas 1101, 1103, 1104, and 1106 included in the adapter tray images can be calculated by performing the coordinate transformation on each pixel from relative positional relations.

However, in the case of the smartphone, an adapter tray image is manually captured when the adapter tray image is captured, and the image may not be captured in parallel with the adapter tray. In addition, there may be a case that the image is captured in an inclined state.

In this case, sizes of upper side and the lower side of the captured adapter tray image may be different in some cases even if, for example, the sizes of upper side and the lower side are the same as each other in the adapter tray information stored in advance. Further, the captured adapter tray image may be inclined and may be a parallelogram depending on an angle.

However, even in this case, the coordinates can be converted by an image deformation processing method. As the coordinate transformation method, for example, there is plane projection transformation using four points of the coordinates of four corners as references. Further, for example, there is affine transformation which can perform skew distortion correction, magnification and reduction, and movement correction when three reference points are set. Furthermore, there is Helmert transformation which can perform rotation, magnification, reduction, and movement correction when two reference points are set.

Regarding the reference point, the reference point such as a check mark (for example, a cross mark) is set to four corners of the adapter tray and on the adapter tray. Thus, the coordinate transformation can be executed based on the check mark and the four corners of the captured adapter tray image.

Further, for example, a plurality of the medium fitting-in areas may exist as in FIG. 11B in some cases. In addition, different images may be fitted in each of the plurality of the medium fitting-in areas. Therefore, whether there is a plurality of the medium fitting-in areas and positions thereof are determined. The determination may be performed either before or after the coordinate transformation. The determination is performed by a contour tracing processing method which detects a position at which a contour of the medium fitting-in area exists in the adapter tray and the number thereof. The contour tracing processing can calculate a boundary of each connection portion, a length of a periphery of the contour, a width and a height of a connection area, and the like.

When a plurality of the medium fitting-in areas are included, the CPU 102 sets an image arrangement frame for each area, causes a user to select a plurality of images, and thus can fit a different image in each area.

Further, for example, when a material of the adapter tray is paper and the like, a user may freely set the medium fitting-in area by cutting with scissors and a cutter. For example, when the medium fitting-in portion in FIG. 11C corresponds to this case, each of the coordinates of the medium fitting-in areas can be subjected to the coordinate transformation of the medium fitting-in area. In other words, the coordinate transformation processing similar to that in FIG. 11A can be performed.

According to the above-described exemplary embodiment, the captured image of the adapter tray is analyzed, and the adapter tray template is generated which indicates the shape and the size of the medium fitting-in portion in the adapter tray. Therefore, if the image processing apparatus 100 as an apparatus for causing a printer to execute printing does not store the information about the various medium fitting-in portions in advance, printing and display can be performed corresponding to the various shapes and sizes of the media.

Further, according to the above-described exemplary embodiment, the example is described in which the information about the shape and the size of the medium fitting-in portion is generated from the captured image of the adapter tray. However, the exemplary embodiment is not limited to the above-described example, and the image processing apparatus 100 may store the adapter tray information in which the shape and the size of the medium fitting-in portion are defined. In this case, the CPU 102 may retrieve the adapter tray information corresponding to the captured adapter tray by comparing the captured image of the adapter tray to the above-described adapter tray information. Accordingly, for example, when the secondary storage device 105 stores a large amount of the adapter tray information pieces, a user can easily set the relevant information.

Further, the example is described in FIG. 11C in which a user freely cuts off the adapter tray and set the medium fitting-in area, however, it may be difficult in some cases to cut the adapter tray according to a size of a medium to be used.

In such a case, for example, a user captures an image of the medium to be used using the internal image capturing device 112 of the image processing apparatus 100 or the scanner of the printer 114. Further, the CPU 102 detects a shape and an actual size of the captured medium by a method similar to the above-described processing for specifying the shape and the actual size of the medium fitting-in portion.

When the adapter tray has a configuration including an ink absorption layer, the CPU 102 causes the printer 114 to print a mark such as a dotted line indicating a contour portion of the medium on the adapter tray having the ink absorption layer based on the detected shape and actual size of the medium. In this regard, information indicating the shape and the actual size of the adapter tray is stored in the ROM 103 and the like of the image processing apparatus 100 in advance. The CPU 102 refers to the information and can specify the coordinates indicating the shape and the actual size of the portion fitted with the medium in the area of the adapter tray. Further, the CPU 102 prints an image indicating an outline of the specified coordinates. Accordingly, a mark indicating the shape and the actual size of the medium can be printed on the adapter tray.

Accordingly, a user can easily cut off the medium fitting-in area based on the dotted line as the mark of the contour portion of the medium printed on the adapter tray.

According to the above-described exemplary embodiment, the example is described in which the image processing apparatus 100 different from the printer 114 executes control processing of the printer of the present exemplary embodiment. However, the exemplary embodiment is not limited to the above-described example, and the main body of the printer 114 may perform the processing similar to that of the image processing apparatus 100 by the CPU 302 of the printer 114.

Further, according to the present exemplary embodiment, the example is described in which an image of the adapter tray is captured in black on a white background, however, the exemplary embodiment is not limited to this example. An image of the adapter tray is captured in such a manner that the background color will be a color different from the color of the adapter tray determined in advance, and thus the similar effect can be obtained.

The above-described exemplary embodiments are one measure for obtaining the effect of the present exemplary embodiment, and when an effect similar to that of the present exemplary embodiment can be obtained even if another similar method is used or another parameter is used, these method and parameter are in the scope of the present exemplary embodiment.

Other Embodiments

The present exemplary embodiment may be applied to a system constituted of a plurality of devices (for example, a host computer, an interface device, a reader, a printer, and the like) and an apparatus constituted of a single device (for example, a printer, a copy machine, a facsimile apparatus, and the like).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-109282, filed May 31, 2016, which is hereby incorporated by reference herein in its entirety.

What is claimed is:

1. A method for an image processing apparatus that communicates with a printing apparatus including:
    a first tray; and
    a second tray having a size smaller than the first tray;
    wherein the first tray includes a first area in which the second tray is fitted,
    wherein the second tray includes a second area in which a recording medium is fitted, and
    wherein the first tray in which the second tray is fitted is attachable to the printing apparatus,
    the method comprising:
    obtaining size information about the first area;
    obtaining image data obtained by capturing the second tray;
    specifying a size of the second area based on the size information about the first area and the image data of the second tray;
    specifying a shape of the second area based on the image data of the second tray;
    displaying an image to be printed based on the specified shape of the second area; and
    instructing a print process based on the specified shape and size of the second area.

2. The method according to claim 1, wherein in the specifying, a shape of an area having a color different from a predetermined color of the second tray in the image data is specified as the shape of the second area.

3. The method according to claim 1, further comprising displaying a message indicating that the image is to be captured without fitting the printing medium to the second area.

4. The method according to claim 1,
    wherein a number of pixels of the first area is specified based on actual size information about and print resolution of the first area, and wherein the size of the second area is specified based on a number of pixels of an area, which corresponds to the second tray, in the image data, a number of pixels corresponding to the second area, and the number of pixels of the first area.

5. The method according to claim 1, wherein in a case where the print resolution is converted to another print resolution, the size of the second area is changed based on a ratio between the print resolution and the another print resolution.

6. The method according to claim 1, wherein template data, in which the shape of the second area is transparent, is generated.

7. An image processing apparatus that communicates with a printing apparatus including, a first tray, and a second tray having a size smaller than the first tray, wherein the first tray includes a first area in which the second tray is fitted, wherein the second tray includes a second area in which a recording medium is fitted, and wherein the first tray in which the second tray is fitted is attachable to the printing apparatus, comprising:
at least one memory storing instructions; and
at least one processor which executes the instructions to cause the image processing apparatus to function as:
an obtaining unit configured to obtain size information about the first area;
obtaining image data obtained by capturing the second tray;
a specifying unit configured to specify a size of the second area based on the size information about the first area and the image data of the second tray;
the specifying unit specifies a shape of the second area based on the image data of the second tray;
a display configured to display an image to be printed based on the specified shape of the second area; and
an instruction unit configured to instruct a print process based on the specified shape and size of the second area.

8. The image processing apparatus according to claim 7, wherein the specifying unit specifies a shape of an area having a color different from a predetermined color of the second tray in the image data as the shape of the second area.

9. The image processing apparatus according to claim 7, further comprising a display unit configured to display a message indicating that the image is to be captured without fitting the printing medium to the second area.

10. The image processing apparatus according to claim 7, wherein a number of pixels of the first area is specified based on actual size information about and print resolution of the first area, and
wherein the size of the second area is specified based on a number of pixels of an area, which corresponds to the second tray, in the image data, a number of pixels corresponding to the second area, and the number of pixels of the first area.

11. The image processing apparatus according to claim 7, wherein in a case where the print resolution is converted to another print resolution, the size of the second area is changed based on a ratio between the print resolution and the another print resolution.

12. A method for an image processing apparatus that communicates with a printing apparatus including:
a first tray; and
a second tray having a size smaller than the first tray,
wherein the first tray includes a first area in which the second tray is fitted,
wherein the second tray includes a second area in which a recording medium is fitted,
wherein the first tray in which the second tray is fitted is attachable to the printing apparatus,
the method comprising:
obtaining image data obtained by capturing the second tray;
generating a template, in which a shape of the second area is transparent based on image data of the second tray; and
executing a display process based on the template and an image to be printed.

13. The method according to claim 12, wherein the display process is executed by arranging the image to be printed on a rear side of the template.

14. The method according to claim 12, wherein a portion, in which the second area is transparent, of the image to be printed is printed.

15. The method according to claim 12, wherein the shape of the second area differs from a rectangular shape.

* * * * *